Oct. 8, 1968    J. A. SURBER    3,404,421
APPARATUS FOR LAUNCHING OBJECTS WITHIN A PIPE LINE
Filed April 6, 1966    2 Sheets-Sheet 1
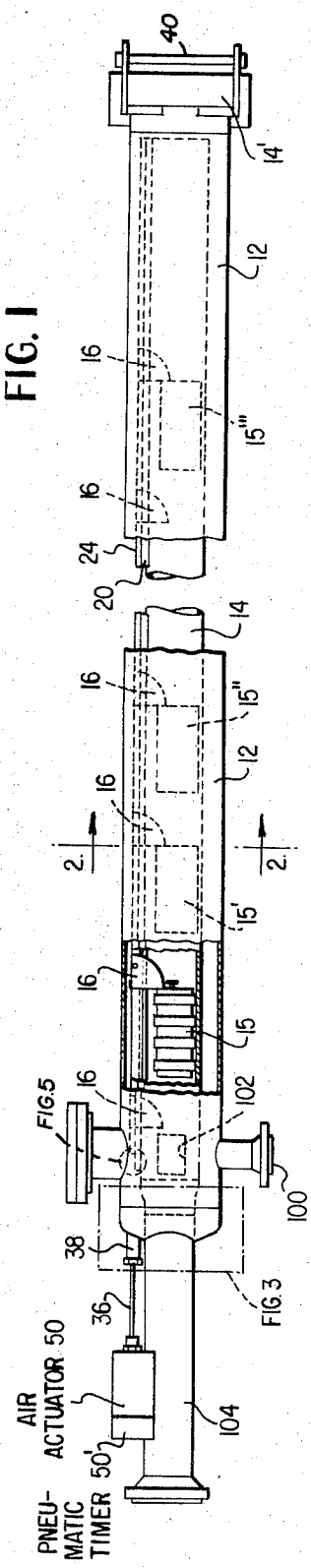
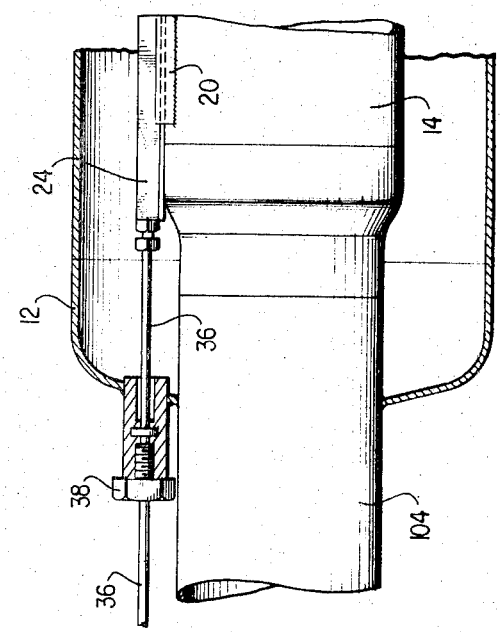
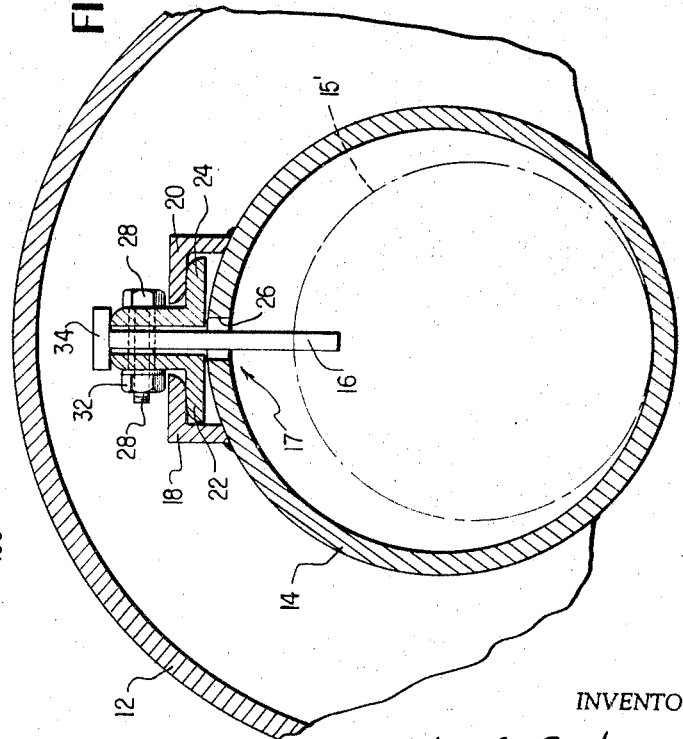
INVENTOR
John A. Surber
BY McLean, Morton & Boustead
ATTORNEY Oct. 8, 1968　　　　　J. A. SURBER　　　　　3,404,421
APPARATUS FOR LAUNCHING OBJECTS WITHIN A PIPE LINE
Filed April 6, 1966　　　　　　　　　　　　　　2 Sheets-Sheet 2
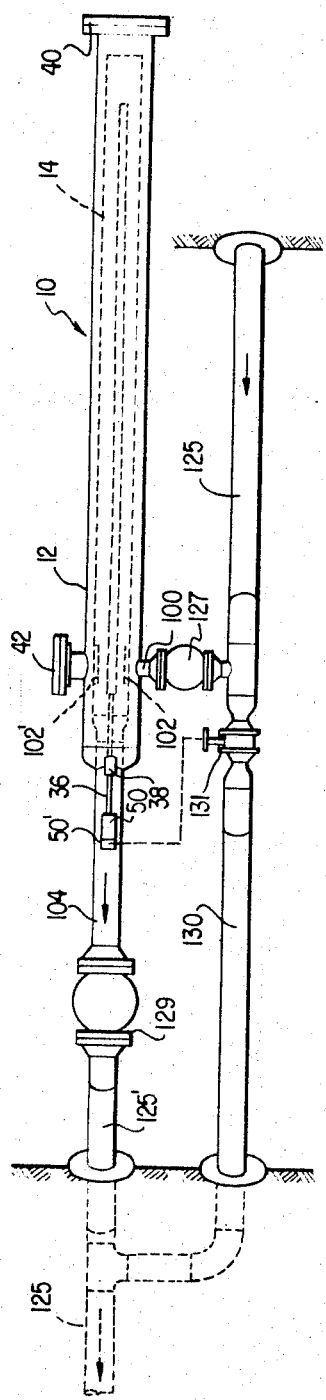
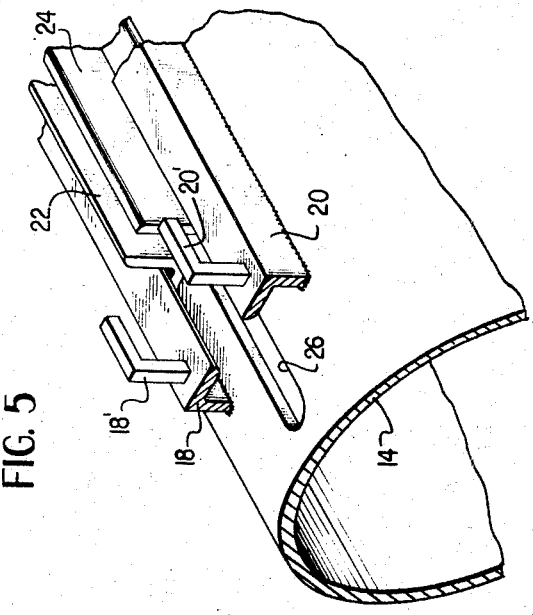
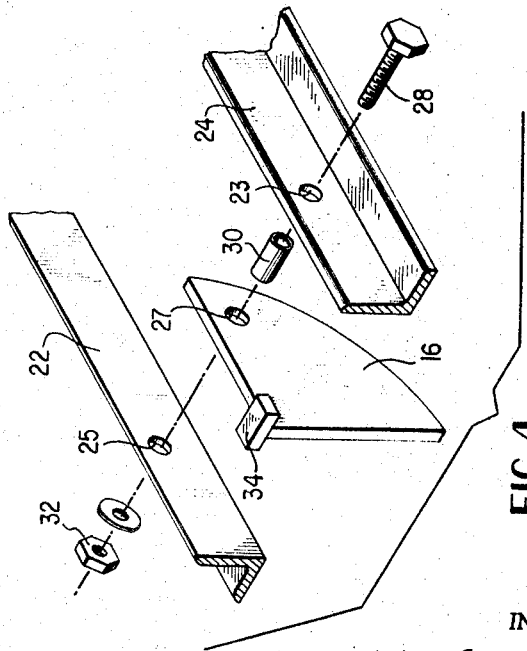
INVENTOR
John A. Surber
BY McLean, Morton & Boustead
ATTORNEY

United States Patent Office 3,404,421
Patented Oct. 8, 1968

3,404,421
APPARATUS FOR LAUNCHING OBJECTS WITHIN A PIPE LINE
John A. Surber, Tulsa, Okla., assignor, by mesne assignments, to Sinclair Research, Inc., New York, N.Y., a corporation of Delaware
Filed Apr. 6, 1966, Ser. No. 540,762
4 Claims. (15—104.06)

ABSTRACT OF THE DISCLOSURE

A launcher for inserting pigs into a pipe line comprising a pair of coaxial pipes, the smaller of which is essentially the same diameter as the pipe line and is adapted for connection to the pipe line. The larger pipe surrounds the smaller pipe and has a length at least as long as the smaller pipe. The smaller pipe is slotted along its upper surface and a longitudinal support along the upper surface of the smaller pipe supports a pig mover element extending through the slot. The pig mover element is pivotally supported to permit rotation out of the slot in one direction only. A hinged closure on the end of the larger pipe adjacent the open end of the smaller pipe can be operated for insertion of a pig into a smaller pipe. An actuator causes the pig mover element to move the pig down the smaller pipe into a position in front of a fluid inlet from which it is propelled by fluid.

---

This invention relates to an apparatus which will permit efficient removal of hydrocarbon liquids, water, or other condensed liquids from low and high pressure gas pipelines and/or sediment in fluid, i.e., liquid as well as gas, pipelines, and more particularly, to a launcher for "pigs" which pass through such high pressure fluid pipelines to remove condensed liquids and/or sediment.

High pressure pipelines transporting fluid material are, for example, frequently required to carry a liquid phase simultaneously with a gaseous phase. Such liquids may be present in the gas when it is injected into the pipeline as in full well stream transport, or liquids such as drip gasoline or crude oil may be injected into a flowing gas stream to be transported with the gas. A problem is presented in such liquid transportation methods, however, since as the gas cools in the pipeline, liquid hydrocarbons, liquid water, etc., tend to coalesce or drop out of the gas, i.e., by condensation, and when such pipelines traverse rough terrain, this condensed or coalesced liquid tends to accumulate in low areas or in areas of lesser velocity. Also, scale rust, sediment, etc., present a similar accumulation problem in liquid as well as gas pipelines. Such accumulations cause high pressure differentials through the pipeline and require excessive horsepower for transmission.

It is possible to minimize accumulation in pipelines and reduce the horsepower by installing drips or drain means at the points of accumulation for removing accumulated liquids and/or sediment. Accumulated liquids and sediment may be discarded or if saleable, transported in trucks to market or to the downstream end of the pipeline. Collection and removal of such accumulated liquids and sediment is not, however, a satisfactory solution to this problem since the procedure requires manpower, is wasteful and sometimes hazardous, and may cause stream pollution. Accordingly, it has been attempted in gas pipelines, to run "pigs," i.e., solid bodies, through the pipeline to push the condensed liquid ahead of them on such a time schedule that excess liquid will not accumulate, or the pigs can be run in according to the needs of the pipelines as indicated by pressure drop. Receivers at the downstream end of the pipelines collect the "pigs" and liquid.

Conventional pigs for use in pipelines are cylindrical in shape with a series of rubber or neoprene cups spaced along the longitudinal axis. Fluid pressure behind the pig expands the cups to provide wiping contact with the inside of the pipeline and force the pig with accumulated liquids or other sediment through the line.

In pipelines carrying predominately gas, the amount of liquid removed from the pipeline by each pig will depend upon the frequency with which individual pigs are sent through the line. While a certain pressure drop is required to force a pig through the pipeline, this is small compared to the pressure drop which occurs when liquid is allowed to accumulate. Frequent launching of pigs will result in each pig carrying to the end of the pipeline only a small amount of liquid and will require therefore only a small amount of storage capacity to contain liquid slugs. Slippage of fluids pass cylindrical pigs is minor and cylindrical pigs are preferred over spheres since, when velocities are low, spheres often become lodged in the pipeline at a point of constriction in one dimension while gas will continue to flow beyond the sphere. Also, brushes and other utility devices adapt more readily to cylindrical pigs than to spheres, and the pigs can be used in pipelines carrying liquids such as water, oil, etc., to remove scale, rust, sediment, etc., from the pipelines. One problem presented, particularly with cylindrical pigs, however, is that they are difficult to introduce into a pipeline. Many attempts have been made to produce an automatic launcher for introducing cylindrical pigs into pipelines but such attempts have not been successful.

One such automatic pig launcher is described in the copending Surber application Ser. No. 412,722, filed Nov. 20, 1964, now U.S. Patent No. 3,266,076. This launcher generally includes a launching barrel having essentially the same diameter as the pipeline, i.e., adapted to contain several pigs, which is connected at one end to the pipeline in such a way as to allow smooth flow or passage of the pigs into the pipeline. Conduits connected to the pipeline upstream of the launcher form a manifold for introducing the pigs into the pipeline. Each conduit is connected to the launching barrel behind a respective pig and permits the introduction of high pressure fluid from upstream of the connection in the pipeline into the barrel, upstream, i.e., to the rear, of the respective pig. A valve arranged in each manifold conduit provides means for selectively applying high pressure fluid behind each individual pig to introduce the pig into the pipeline. Although this launcher is satisfactory, the piping and control system for the valves is relatively complicated.

The present invention has as its object the provision of an improved automatic launcher for cylindrical, as well as spherical, pigs. The apparatus of the present invention operates to move each pig into position so that a gas stream may be diverted to supply gas pressure behind each pig. The pigs are moved directly into the gas stream in the pipeline.

In general, the pig launcher of this invention comprises a launching barrel, connected to a gas pipeline, having a portion through which the main gas stream in the pipeline passes and a means for mechanically moving a pig into the main gas stream. For a more detailed description to the present invention, reference may be had to the accompanying drawings which illustrate several embodiments of the invention and wherein:

FIGURE 1 schematically illustrates a preferred embodiment of the invention;

FIGURE 2 is a cross-sectional view taken along section line 2—2 of FIGURE 1;

FIGURE 3 is a sectional view of the area in circular section of line 3 of FIGURE 1;

FIGURE 4 is an exploded view of a portion of the embodiment of FIGURE 1;

FIGURE 5 is an enlarged view of the area within circle 5 in FIGURE 1;

FIGURE 6 illustrates a flow sheet of a system incorporating the device of FIGURE 1.

Referring now to FIGURE 1, the launcher of this invention, generally designated by 10, comprises a large pipe 12 and a smaller pipe 14, essentially the same diameter as the gas line 104 to which it is connected and sufficiently long to contain several pigs, for example, four cylindrical pigs 15, 15', 15", and 15''' having wiper elements thereon. Pipes 12 and 14 are essentially coaxially arranged and a hinged closure 40 is provided at the end of pipe 12 opposite the connection of pipe 14 to gas line 104 to provide access to the open end 14' of pipe 14 into which the individual pigs 15, 15', etc., may be placed. The other end of pipe 12 is sealed at pipe 14.

The invidivdual pigs 15, 15', etc., are moved within the smaller pipe 14 by a mechanism, generally designated by numeral 17, see FIGURE 2, which includes a plurality of pig mover elements 16 arranged within a slot 26 in the upper part of the smaller pipe 14. Referring now more particularly to FIGURES 2 through 5 which illustrate in greater detail the pig moving means 17, the individual pig mover elements 16 are pivotally supported from two angle irons 22 and 24 arranged on the opposite sides of slot 26 and adapted for longitudinal movement along the smaller pipe 14. Two angle irons 22 and 24 move within the area formed by two additional angles 18 and 20 which are welded to the smaller pipe 14 on opposite sides of the slot 26. The pig mover elements 16 are each pivotally supported from angles 22 and 24 at spaced intervals therealong. The number of pig mover elements may vary as desired and the number of pigs inserted into the end 14' may be as many in number as there are individual mover elements 16, but may be only one, if such is desirable. The individual pig mover elements 16 are supported as illustrated in FIGURES 2 and 4 by a bolt 28 which extends through aperture 23 in angle iron 24, aperture 27 in pig mover element 16 and aperture 25 in angle iron 22. A nut 32 tightens the bolt 28. A sleeve 30, preferably of Teflon, nylon or other self lubricating bearing material is arranged in aperture 27 to provide for better wearing and easier pivotal movement of the pig mover element 16. A stopbar 34 is welded or otherwise secured to the top front part of the individual pig mover elements 16 at the end opposite the aperture 27 to limit pivotal movement of the pig lanucher number 16. As the element 16 is moved forward it will push whatever rests in front of it, whereas when it is moved to the rear it will pivot over an object in its path.

Movement of the angle irons 22 and 24, and consequently pig mover elements 16, is accomplished by activator rod 36 which is attached to both of the angles 22 and 24, see FIGURE 3. Activator rod 36 extends through a packing 38 in the larger pipe 12 and is activattd by an air actuator 50 and pneumatic timer 50', see FIGURE 1. The timer 50', which may be omitted if desired, is of conventional construction and can be used to time the injection of pigs into the gasline at predetermined intervals. Timer 50' controls operation of the air actuator and valve 131 (see FIGURE 6) as described below. The actuator is, preferably, a piston-cylinder arrangement which moves the angle irons 22 and 24 in a push-pull fashion a distance equal to or slightly in excess of the length of an individual pig 15, etc., which distance is also approximately that between the individual pig mover elements 16 such as shown in FIGURE 1. Two locking bars 18' and 20' (FIGURE 5) each welded to a respective angle 18 or 20, prevent accidental movement of the angle irons 22 and 24 to damage pipe 12. The locking bars 18' and 20' limit movement of the stopbar 34.

In operation, gas passes through the gasline, illustrated as gas inlet 100, see FIGURE 1, through gas access openings 102, only one of which is shown, into gasline 104 which is, in effect, a continuation of the smaller pipe 14 and is coaxial and essentially equal in diameter to the smaller pipe 14. The air actuator, when it is desired to insert a pig into the gas flow is operated in a push-pull fashion to move the individual pigs 15, 15', etc., so that the foremost pig 15 will be pulled into the gas flow at the gas access openings 102 and the pressure of the gas directed, e.g., by the timer 50', through gas inlet 100 will force the pig forward through the gas line in accordance with procedures as known in the art. As the pig 15, the foremost pig, is inserted into the gasline each pig following in series therebehind, i.e., pig 15', 15", etc., is moved forward one position so that as the actuator 50 moves a pig forward the following pig will always be in a position for insertion into the gasline. If by chance a pig is not in position the actuator may have to be actuated several times to move a pig several positions forward.

A typical flow plan for this invention is illustrated in FIGURE 6. As illustrated in this figure, a gas line 125 has a launcher 10 connected therein, bypassing portion 130 of line 125, by an inlet line 100 which contains a valve 127. In FIGURE 6 two openings 102 and 102' are provided in the smaller interior pipe 14 for passage of the gas through the launcher 10. Gas flows from the launcher 10 through the gas line 104 and valve 129 into a continuation of the original gas discharge line 125'. Line portion 130 contains a valve 131 actuated by the timer 50', for example, when pigs are to be inserted into the launcher 10. As valve 131 is operated to partially close line portion 130, it creates a back pressure in line 125 which is diverted through line 100 and behind the pig to be launched which is pulled forward by the rod 36 and air actuator 50. Without the bypass arrangement, it would be necessary to close down the gas line for insertion of the pigs.

It is claimed:

1. A launcher for the insertion of pigs into a high pressure gas line comprising a pair of coaxially arranged pipes, the smaller of said pipes having an upper surface, having essentially the same diameter as said gas line, having a first end adapted for connection to said gas line and having a second end opposite said smaller pipe first end; the larger of said pipes surrounding said smaller pipe and extending the full length thereof, having a first end closed about said smaller pipe adjacent said smaller pipe first end, and having a second end adjacent said smaller pipe second end; closure means for closing said larger pipe second end; gas inlet means in said larger pipe, aperture means in said smaller pipe adjacent said smaller pipe first end; and means for moving at least one pig in said smaller pipe to a position downstream of the aperture means in said smaller pipe, said pig moving means comprising at least one pig mover element, said smaller pipe having a slot along the upper surface into which said pig mover element extends, longitudinal support means for said element arranged along the upper surface of said smaller pipe, said pig mover element being pivotally supported from said support means for pivotal movement in one direction only out of said smaller pipe, and actuator means for moving said support means longitudinally of said smaller pipe whereby a pig in front of said element is moved into said position downstream of the aperture means.

2. The launcher of claim 1 further including timer means for operating said actuator means.

3. A gas pipeline system comprising in combination a gas line, a launcher as defined in claim 1, said launcher being interconnected with said gas line, the smaller pipe in said launcher being coaxial with said gas line, conduit means connecting said gas line upstream of the interconnection with said launcher to said gas inlet means of the launcher, valve means in said gas line between said interconnection with the launcher and the interconnection with said conduit means.

4. The system of claim 3 further including timer means operatively connected to said actuator means and said valve means to at least partially close said valve means when a pig is in position downstream of said gas inlet means.

References Cited

UNITED STATES PATENTS 2,948,143   8/1960   Pruitt _____ 15—104.06
2,953,157   9/1960   Osborne et al. _____ 15—104.06

EDWARD L. ROBERTS, *Primary Examiner.*